(12) United States Patent
Zubot et al.

(10) Patent No.: US 7,638,057 B2
(45) Date of Patent: Dec. 29, 2009

(54) METHOD OF TREATING WATER USING PETROLEUM COKE

(75) Inventors: Warren Zubot, Edmonton (CA);
Michael Mackinnon, Edmonton (CA);
Keng Chung, Edmonton (CA)

(73) Assignee: Syncrude Canada Ltd., Fort McMurray (CA)

( * ) Notice: Subject to any disclaimer, the term of this patent is extended or adjusted under 35 U.S.C. 154(b) by 0 days.

(21) Appl. No.: 11/876,509

(22) Filed: Oct. 22, 2007

(65) Prior Publication Data
US 2009/0101574 A1    Apr. 23, 2009

(51) Int. Cl.
*C02F 3/00* (2006.01)
(52) U.S. Cl. .............. 210/631; 210/661; 210/663; 210/690; 210/691; 210/694
(58) Field of Classification Search .......... 210/631, 210/661, 663, 690, 691, 694
See application file for complete search history.

(56) References Cited

U.S. PATENT DOCUMENTS

| | | | | |
|---|---|---|---|---|
| 4,036,750 A | * | 7/1977 | Jaros et al. | 210/669 |
| 4,053,396 A | * | 10/1977 | Trense et al. | 210/618 |
| 4,082,694 A | | 4/1978 | Wennerberg et al. | |
| 4,230,602 A | * | 10/1980 | Bowen et al. | 502/434 |
| 4,743,357 A | * | 5/1988 | Patel et al. | 208/113 |
| 6,733,636 B1 | | 5/2004 | Heins | |
| 6,932,956 B2 | | 8/2005 | Jia | |
| 7,037,434 B2 | | 5/2006 | Myers et al. | |
| 2007/0199867 A1 | * | 8/2007 | Zhang et al. | 210/103 |

OTHER PUBLICATIONS

Scott, A. C., M.D. MacKinnon, and P.M. Fedorak. 2005. Naphthenic acids in Athabasca oil sands tailings waters are less biodegradable than commercial naphthenic acids. Environ. Sci. Technol., 2005, 39, 8388-8394.
Chung, K. H., L.C.G. Janke, R. Dureau, E. Furimsky. 1996. Leachability of cokes from Syncrude stockpiles. Environ. Sci. Engg., Mar. 1996, 3: 50-53.
Effects of oil sands process-affected waters and naphthenic acids of yellow perch (*Perca flavescens*) and Japanese medaka (*Orizias latipes*) embryonic development, Lisa E. Peters, M. MacKinnon, T. Van Meer, M. R. van den Heuvel and D. G. Dixon, Chemosphere, Abstract, vol. 67, Issue 11, May 2007, pp. 2177-2183.
Production of activated carbon from petroleum coke and its application in water treatment for the removal of metals and phenol, RM Ramirez Zamora, R. Schouwenaars, A, Duran Moreno and G, Buitron, Abstract, Water Science & Technology, vol. 42, Nos. 5-6, p. 119-126 (2000).

* cited by examiner

*Primary Examiner*—Chester T Barry
(74) *Attorney, Agent, or Firm*—Bennett Jones LLP

(57) ABSTRACT

A process for treating water containing dissolved organics, for example, oil sands process-affected water, using petroleum coke is provided, comprising: removing petroleum coke from a coking operation; forming a petroleum coke/water slurry by adding the water to be treated to the petroleum coke; and mixing the slurry for a sufficient time in a carbon adsorption reactor to allow the petroleum coke to adsorb a substantial portion of the dissolved organics from the water.

23 Claims, 4 Drawing Sheets

METHOD OF TREATING WATER USING PETROLEUM COKE

FIELD OF THE INVENTION

The present invention relates to a method of treating water using petroleum coke. More particularly, water produced during the recovery of bitumen from oil sands (hereinafter referred to as oil sands process-affected water or OSPW) is treated with petroleum coke produced in coker reactors to remove dissolved organics therein.

BACKGROUND OF THE INVENTION

The demands for water in oil sands operations are high and therefore most operations must rely on recycling process water. However, during oil sands processing, a significant amount of dissolved inorganic (e.g., salts) and organic (e.g., carboxylic acids, hydrocarbon) constituents are released into process waters. Recycling of the oil sands process-affected water (OSPW) only serves to increase the levels of dissolved inorganic and organic content. Currently no OSPW is released from the operations.

In order to meet water quality criteria for release, it is necessary to treat the OSPW to reduce the dissolved organics, such as naphthenic acids and other hydrocarbons. Naphthenic acids have been demonstrated to be toxic to aquatic biota (Alberta Environment Protection. 1996. Naphthenic acids background information discussion report. Edmonton, Alberta, Alberta Environment, Environmental Assessment Division). Thus, the concentration of naphthenic acids present in OSPW must be reduced to levels that are not detrimental to the biological community of a receiving aquatic system. Removal of naphthenic acids may be accomplished with either natural bioremediation or treatment methods to remove them from the OSPW.

Naphthenic acids (NAs) are natural constituents in many petroleum sources, including bitumen in the oil sands of Northern Alberta, Canada. NAs are complex mixtures of predominately low molecular weight (<500 amu), fully saturated alkyl-substituted acyclic and cycloaliphatic (one to more than six rings) carboxylic acids (Brient, J. A., Wessner, P. J., and Doyle, M. N. 1995. Naphthenic acids. In Encyclopedia of Chemical Technology, 4th ed.; Kroschwitz, J. I., Ed.; John Wiley & Sons: New York, 1995; Vol. 16, pp 1017-1029). They are described by the general empirical formula $C_nH_{2n+Z}O_2$, where n indicates the carbon number and Z is zero or a negative, even integer that specifies the hydrogen deficiency resulting from ring formation (i.e. $Z=-2$ indicates 1-ring, $Z=-4$, 2-rings etc.). While some of naphthenic acids will biodegrade rapidly, a fraction of the naphthenic acids associated with the OSPW have been shown to be more recalcitrant (Scott, A. C., M. D. MacKinnon, and P. M. Fedorak. 2005. Naphthenic acids in Athabasca oil sands tailings waters are less biodegradable than commercial naphthenic acids. ES&T 39: 8388-8394). In order to facilitate release of OSPW, it is desirable to find options for more rapid removal of NAs from OSPW that is effective, targeted to the dissolved organics and economically viable.

In surface oil sands mining operations for recovery of bitumen, also referred to as open-pit oil sands operations, hot or warm water, to which a process aid, such as caustic (NaOH) may be added, is mixed with the oil sand ore (about 1.5-2 $m^3$ of water per barrel of oil extracted) in order to separate the bitumen from the oil sand. The resulting oil sand slurry goes through a series of separators to produce lean bitumen froth. The tailings stream produced during bitumen extraction, which comprises water, sand and un-recovered bitumen, is transported to settling basins, where the solids settle by gravity, and the resulting release water (OSPW) is recycled for reuse in the extraction process. Also included as recycle or release water is seepage water from sand structures containing settling basins. It is during this extraction process that leaching of both inorganic and organic constituents will occur.

Bitumen can also be recovered from oil sands in situ (in the geological formation) using the Steam Assisted Gravity Drainage process (the "SAGD" process). SAGD requires the generation of large amounts of steam in steam generators, which steam is injected via injection wells to fluidize the bitumen for recovery. A bitumen/water mixture results and the mixture is pumped to the surface where the bitumen is separated from the water. The produced water stream (oil sands process-affected water) is then reused to produce more steam for extraction. As in surface mining operations, the produced water stream contains dissolved organics that need to be removed. The produced water in SAGD must be treated to meet requirements for once-through steam generators, and the retentate from this preparation will contain elevated NAs.

Bitumen produced from either surface mining operations or SAGD can be further upgraded by thermal cracking using either a delayed or fluid coker reactor, as are known in the art, to take the highly viscous bitumen (API gravity of about 8°) to a less viscous hydrocarbon product (API gravity of about 30°). During coking, an excess amount of petroleum coke is produced, which excess coke is currently disposed of as waste product. Thus, petroleum coke produced from coking operations is a readily available commodity.

There is a need for an effective, selective and economical water treatment process for the OSPW produced during bitumen oil extraction processes so that the water can be reused in the operation or released into the environment.

SUMMARY OF THE INVENTION

The present invention is based on the surprising discovery that petroleum coke can be used to treat process water from oil sands extraction operations to remove a substantial portion of dissolved organics without having to activate the petroleum coke first. The present invention is particularly effective in treating oil sands process-affected water (OSPW) produced during surface oil sands mining operations, and, particularly, when fresh product coke (FPC) produced during fluid coking operations is used.

In one broad aspect of the invention, a process for treating water containing dissolved organics is provided, comprising:
  removing petroleum coke from a coking operation;
  forming a petroleum coke/water slurry by adding the water to be treated to the petroleum coke; and
  mixing the petroleum coke/water slurry for a sufficient time in a carbon adsorption reactor to allow the petroleum coke to adsorb a substantial portion of the dissolved organics from the water.

The water containing dissolved organics can be oil sands product water generated during bitumen extraction processes used in either oil sands surface mining or in situ mining operations. For example, but not meaning to be limiting, OSPW can be from obtained from tailings settling basins (fresh release water from extraction tailings) or from reclamation components (aged OSPW) such as end-pit lakes, sand dyke seepage, etc. However, it is understood that the present invention can be used to treat any water source that has a substantial amount of dissolved organics such as naphthenic acids and hydrocarbons, for example, which could be present in ground water.

There are two main types of petroleum coke that can be produced depending on the type of coker reactor used, namely, fluid coke and delayed coke. A typical fluid coke comprises particles having an average particle size of about 200 μm in diameter with an onion-like layered structure (Chung, K. H., L. C. G. Janke, R. Dureau, E. Furimsky. 1996. Leachability of cokes from Syncrude stockpiles. ES &T (3): 50-53). Preferably, hot fresh petroleum coke is used, which has been removed directly from the coker burner of the coking operation.

Delayed coke from delayed coking operations can also be used. However, delayed coke is produced in the form of larger lumps. Thus, when delayed coke is used in the present invention, the lumps of coke are preferably first pulverized to give a fine powder having an average particle size comparable to fluid coke.

Contrary to conventional thinking (see, for example, U.S. Pat. No. 6,932,956), hot fresh petroleum coke removed from a fluid coking operation is not unreactive, although the activity of hot fresh petroleum coke is relatively low in comparison with commercial particle or granular activated carbon (e.g., on average about 5-10 $m^2/g$ for fluid coke versus about 500-1500 $m^2/g$ for activated carbon). However, at the applicant's operation, about 0.02-0.03 t of coke per barrel of bitumen upgraded is produced. Thus, a large quantity of petroleum coke is readily available.

Thus, in one embodiment, OSPW/coke slurry is formed and pipeling of the slurry performs as the reactor for adsorption. Thus, when slurry densities of about 15 to about 30% by wt, are used, no enhanced activation is required. At the rates of fresh petroleum coke production in a normal coking operation, there is a sufficient supply of the coke to treat more than 10 million $m^3$ annually. Hence, the present invention offers an economical way to treat OSPW, as producing activated carbon from petroleum coke (that seen in the coke storage deposits) can be very costly and time consuming. Furthermore, because of petroleum coke's unique properties, in particular, fluid coke, it is expected that the activation process could be problematic as a result of environmental issues such as energy consumption and fugitive emissions. Currently, most of the excess fluid coke produced is stored in special cells or in beaches within current settling basins so it is available for future needs. Hence, the present invention utilizes a product that has previously been considered in the industry to be a waste product.

In one embodiment, the petroleum coke is hot fresh fluid coke produced during fluid coking, where coke is produced at high enough rates such that the concentration of the coke in the resulting coke/water slurry can be expected to range from about 10% to about >40% by weight. It has been shown that optimum dosages will range between about 15% to about 30% by weight.

The present invention is particularly effective in reducing the concentration of naphthenic acids. For example, when using OSPW produced during oil sands mining operations, for example, OSPW from extraction tailings, a reduction of the naphthenic acid concentrations ranging from 70% to more than 90% is routinely obtained. The efficiency of organic carbon removal is dependent on the petroleum coke content in the slurry.

The carbon adsorption reactor of the present invention can be any stirred tank reactor known in the art, such as a continuous flow stirred tank reactor. In the alternative, the carbon adsorption reactor can be a plug flow reactor, such as a pipeline of sufficient length to provide proper mixing and residence time.

The process for treating water containing dissolved organics may further comprise the step of separating the petroleum coke from the treated water. One embodiment takes advantage of the rapid settling characteristics of the coke in the transport slurries. Thus, gravity settling and collection of release waters, or design of deposit cells with bottom drainage will produce treated water with dissolved organics such as NAs removed. Passive separation methods that use open cells have the added benefit of reducing suspended solids contents by increasing the residence time of the slurry and when allowed to percolate through the petroleum coke, further improving this aspect of water quality.

Another embodiment involves more proactive treatments to reduce turbidity of treated waters, which include filtration or ultrafiltration using filtration membranes such as Zee-Weed™ Ultrafiltration Membranes. Once the treated water has been separated from the petroleum coke, the treated water can be recycled for operations needs or can be evaluated for potential release into the environment, either directly or after a further treatment option.

In a preferred embodiment, the treated water that is not recycled for operation needs but is being returned into the environment may be further treated using advanced oxidation methods such as ozonation, biological reactors such as engineered or natural aquatic systems, or membrane methods such as nanofiltration and reverse osmosis. These methods would further remove remaining dissolved organics, specifically the naphthenic acids, so that release into the environment would likely be possible.

BRIEF DESCRIPTION OF THE DRAWINGS

The present invention, both as to its organization and manner of operation, may best be understood by reference to the following descriptions, and the accompanying drawings of various embodiments wherein like reference numerals are used throughout the several views, and in which.

DESCRIPTION OF THE PREFERRED EMBODIMENTS

The detailed description set forth below in connection with the appended drawings is intended as a description of various embodiments of the present invention and is not intended to represent the only embodiments contemplated by the applicant. The detailed description includes specific details for the purpose of providing a comprehensive understanding of the present invention. However, it will be apparent to those skilled in the art that the present invention may be practiced without these specific details.

Figure 1:
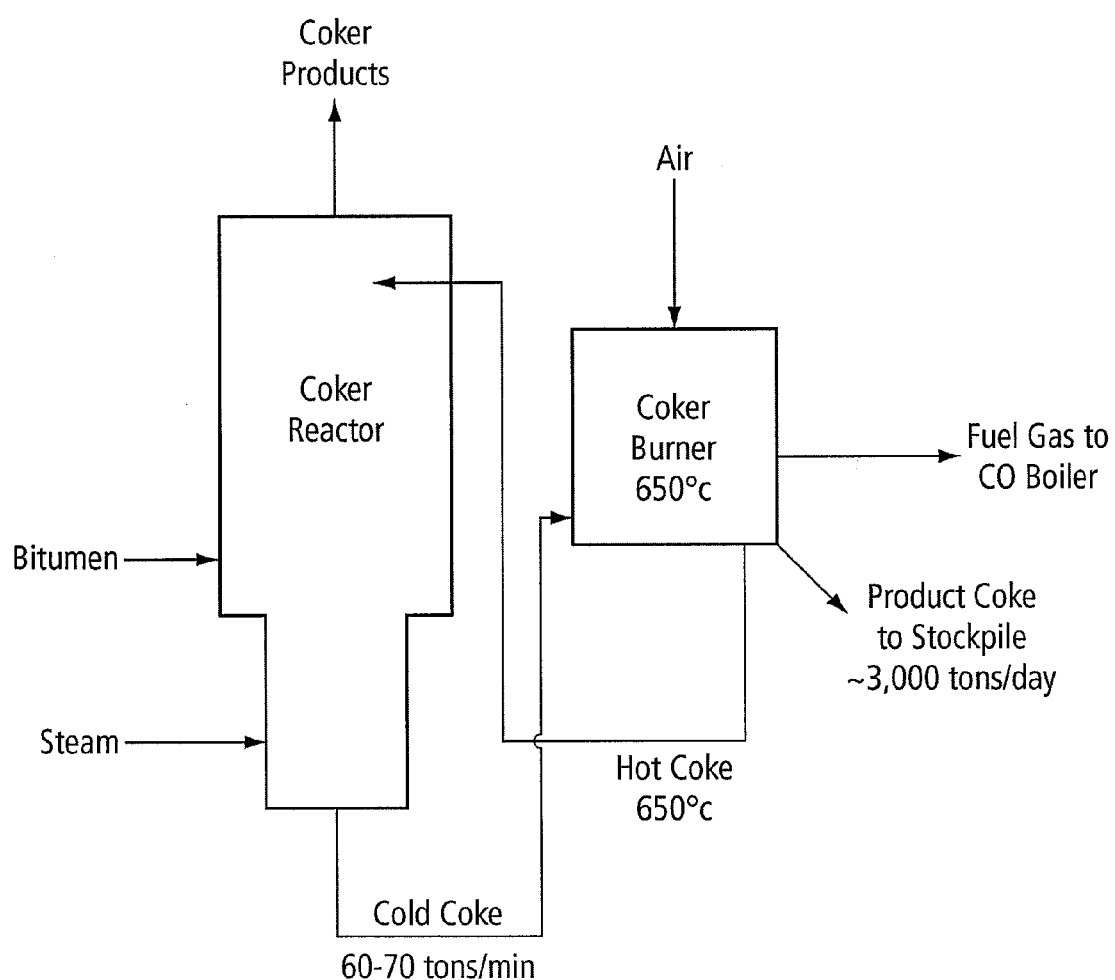
FIG. 1 is a simplified schematic of a known fluid coking circuit.

A fluid coking operation is illustrated in FIG. 1. It involves a fluidized bed coker reactor working in tandem with a fluidized bed coke burner. In the reactor, incoming feed oil contacts a fluidized bed of hot coke particles and heat is transferred from the coke particles to the oil. The reactor is conventionally operated at a temperature of about 530° C. Hot coke entering the reactor is conventionally at a temperature of about 600-650° C. to supply the heat requirement of the coker. "Cold" coke is continuously removed from the reactor and returned to the burner. The cold coke leaving the reactor is at a temperature of about 530° C. In the burner, the cold coke is partially combusted with air, to produce hot coke. Part of the hot coke is recycled to the reactor to provide the heat required. The balance of the hot coke is removed from the burner as product coke. The burner is conventionally operated at a temperature of 650° C. The burner temperature is controlled by the addition of air.

When petroleum coke exits the coker burner, it is either recycled back to the coker reactor (referred to as "hot coke") or disposed of as waste product (referred to as "product coke" or "fresh product coke"). The fresh product coke can be temporarily stored in coke silos or it can be used directly to form an OSPW/coke slurry. Surprisingly, the fresh product coke was found to be effective in removing dissolved organics such as naphthenic acid from oil sands process water when an OSPW/coke slurry is formed and the slurry is subsequently pipelined.

Figure 2:
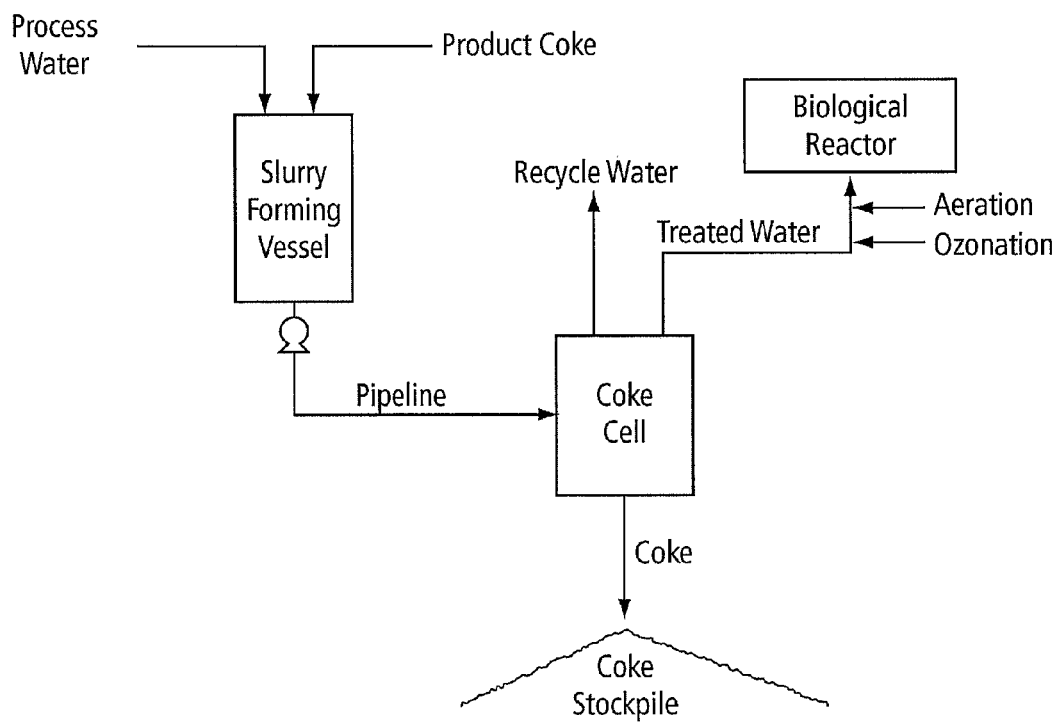
FIG. 2 is a simplified schematic of an embodiment of the water treatment process of the present invention.

FIG. 2 is a schematic of a water treatment process of the present invention. In this embodiment, process water obtained from a bitumen extraction operation is first slurried with product coke in a vessel. Routinely, process water present as the release water for recycle in the settling basins from open pit oil sands operations will contain elevated dissolved organic carbon content (50-70 mgC/L), of which naphthenic acids are the dominant constituent (concentrations range from 50-80 mg/L). Typically, the coke/water slurry is formed such that the coke concentration averages between about 20 to about 30% by wt or about 2 to about $3 \times 10^5$ mg/L.

The coke/water slurry is then pumped through a pipeline (a plug-flow reaction vessel) using a slurry pump where the adsorption of dissolved organics by the petroleum coke primarily occurs. The use of a pipeline will not only result in adsorption of dissolved organics, but will also allow the product coke to be transported to a suitable area for stockpiling. The pipeline length will vary; however, routinely the pipeline is approximately 5 km or more in length to give the slurry sufficient residence time (>20 minutes) for the adsorption process to occur. As previously mentioned, instead of a pipeline as the carbon adsorption vessel, any stirred vessel can be used as a carbon adsorption reactor, where adsorption of the dissolved organics to the petroleum coke can occur. When using a stirred vessel, the slurry may be formed directly in the vessel, eliminating the need for a slurry-forming vessel.

The petroleum coke can then be separated from the treated water using any number of separation techniques or devices known in the art. For example, as previously mentioned, the petroleum coke may be separated from the treated water by proactive methods involving filters or in a more passive manner using sedimentation tanks or open pond fills, with either water release or underflow gravity filtration through coke and sand beds. The remaining petroleum coke can then be stored in cells or stockpiles. Use of open pond fills has the added benefit of increasing the residence time of the slurry and therefore one can collect water that has been allowed to percolate through the bed of petroleum coke.

The treated water that has been separated from the petroleum coke can now be used as recycle water in further extraction operations or it can be evaluated for suitability for release to the environment. Depending upon the initial dissolved organics concentration of the water, the treated water might require further treatment such as with advanced oxidation or bioremediation reactor. Thus, additional methods for degradation or bioremediation of the remaining organics such as NAs may be required prior to the release of treated water into the environment.

Figure 3:
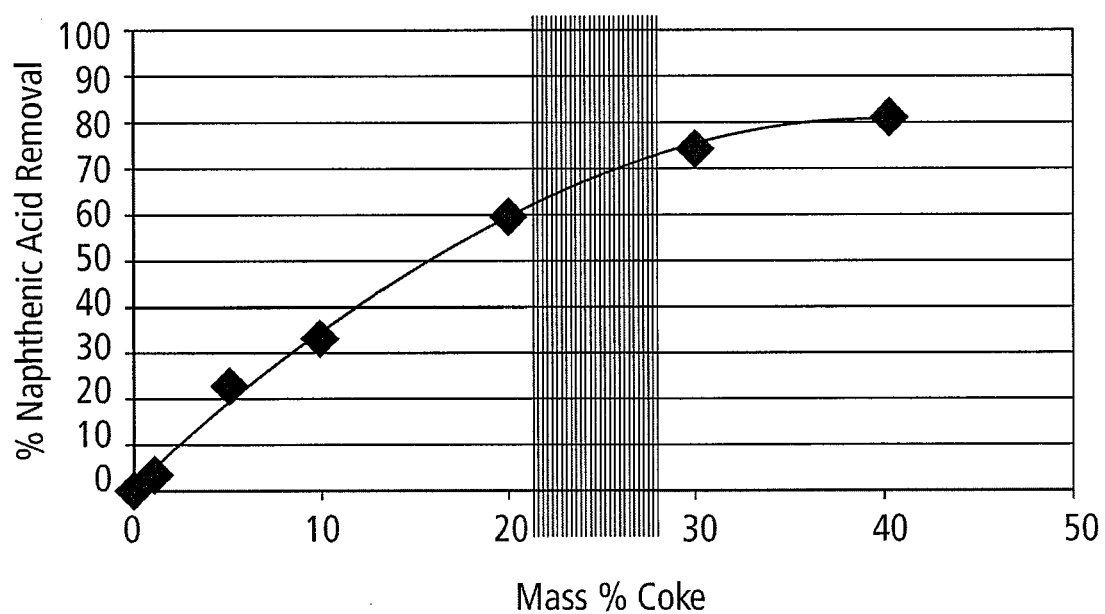
FIG. 3 is a graph showing the % naphthenic acids removed versus the mass % of petroleum coke (fresh product coke) used.

FIG. 3 is a graph which shows the % naphthenic acids removed from process water containing about 50-80 ppm naphthenic acids as a function of the mass percent of petroleum coke used in the preparation of the coke/water slurry. In this instance, the petroleum coke was obtained from a fluid coking operation as is routinely used in Fort McMurray, Alberta by the applicant. Slurries were formed using OSPW and increasing amounts of fluid coke. The slurries were mixed at room temperature from several minutes to >48 hours using either a propeller stirrer for shorter times or a simple shaker for longer times. The coke was then allowed to settle out by gravity and the water analyzed for naphthenic acids content as discussed below. It can be seen from the graph in FIG. 3 that a significant amount of the naphthenic acids were removed even when using only 10% by mass of fluid coke. Beyond 40 mass % of coke in the slurry, the % of naphthenic acids removed started to level out.

Figure 4:
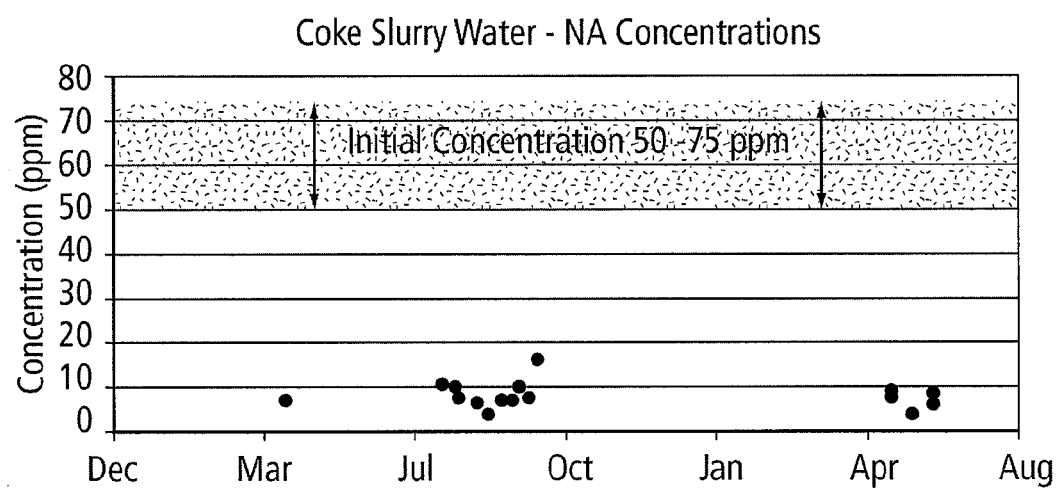
FIG. 4 is a graph showing the concentration of naphthenic acids (ppm) at various time intervals during continuous operation of a pipeline reactor.

FIG. 4 presents data obtained during the continuous operation of a coke slurry pipeline as the carbon adsorption reactor, where samples were collected at the point of discharge at various times over the course of several months. Slurries were formed using OSPW that was a mixture of process waters from two tailings settling basins and fluid coke (product coke), both obtained from applicant's oil sands operation. Typically, the coke concentration in the slurry was about 20% by mass or about 200,000 ppm and the naphthenic acid concentration of the OSPW generally ranged anywhere between 50 ppm and 80 ppm. The pipeline used was approximately 5 km long. Slurry samples were taken at the end of the pipeline and the naphthenic acid concentrations measured by the technique of methylene chloride extraction/Fourier Transform Infrared Spectroscopy (FTIR) as described in Syncrude Analytical Methods Manual, 4th Edition, 1995. Syncrude Research Report 543.028S99R. Syncrude Canada Ltd., Edmonton, Alberta, Canada, incorporated herein by reference.

As mentioned, the naphthenic acid concentration in the process water ranged anywhere between 50 ppm and 80 ppm. These values were used to represent the concentration of naphthenic acids at the beginning of the pipeline. It can be seen from FIG. 4 that on average the naphthenic acid concentration at the end of the pipeline ranged from about 5 ppm to 15 ppm, representing a naphthenic acid removal efficiency of between 70% and 90%. The data shown is based on normal fluid coker operating conditions.

While the invention has been described in conjunction with the disclosed embodiments, it will be understood that the invention is not intended to be limited to these embodiments. On the contrary, the current protection is intended to cover alternatives, modifications and equivalents, which may be included within the spirit and scope of the invention. Various modifications will remain readily apparent to those skilled in the art.

What is claimed is:

1. A process for treating water containing dissolved organics, comprising:
   removing a portion of petroleum coke from an oil sands bitumen coking operation, said petroleum coke having a first degree of activation prior to removal;
   adding the water to be treated to the portion of petroleum coke to form a petroleum coke/water slurry having a petroleum coke concentration of at least about 10% by mass, the portion of petroleum coke having substantially the first degree of activation; and mixing the petroleum coke/water slurry for a sufficient time to allow the portion of petroleum coke to adsorb a substantial portion of the dissolved organics from the water.

2. The process as claimed in claim 1, wherein the water containing dissolved organics is oil sands process-affected water from an oil sands extraction operation.

3. The process as claimed in claim 1, wherein the coking operation is a fluid bed coking operation and the petroleum coke is fluid coke.

4. The process as claimed in claim 1, wherein the oil sands extraction operation is a surface mining operation.

5. The process as claimed in claim 2, wherein the oil sands process-affected water is obtained from tailings settling basins.

6. The process as claimed in claim 1, wherein the coking operation is a delayed coking operation and the petroleum coke is delayed coke, the process further comprising:
pulverizing the delayed coke to a powder having an average particle size of about 200 μm prior to forming the petroleum coke/water slurry.

7. The process as claimed in claim 1, wherein the mixing step is substantially performed in a plug-flow reactor including a pipeline.

8. The process as claimed in claim 1, wherein the mixing step is substantially performed in a stirred tank reactor.

9. The process as claimed in claim 1, wherein the portion of petroleum coke in the petroleum coke/water slurry is between about 10 to about 50 percent by mass.

10. The process as claimed in claim 1, wherein the portion of petroleum coke in the petroleum coke/water slurry is between about 15 to about 30 percent by mass.

11. The process as claimed in claim 1, further comprising:
separating the treated water from the portion of petroleum coke.

12. The process as claimed in claim 11, wherein the treated water is separated from the portion of petroleum coke by ultrafiltration, sand filtration, coke cells, sedimentation tanks, open pond fills, or combinations thereof.

13. The process as claimed in claim 11, further comprising:
subjecting the separated treated water to biodegradation in a biological reactor or degradation by advanced oxidation methods.

14. A process for treating water containing dissolved organics consisting essentially of the steps of:
removing petroleum coke from an oil sands bitumen coking operation;
mixing the water to be treated with the petroleum coke to form a petroleum coke/water slurry having a petroleum coke concentration of at least about 10% by mass; and
allowing the petroleum coke/water slurry to mix for a sufficient length of time so that the petroleum coke adsorbs a portion of the dissolved organics from the water.

15. The process as claimed in claim 14, wherein the water containing dissolved organics is oil sands process-affected water from an oil sands extraction operation.

16. The process as claimed in claim 14, wherein the coking operation is a fluid bed coking operation and the petroleum coke is fluid coke.

17. The process as claimed in claim 14, wherein the oil sands extraction operation is a surface mining operation.

18. The process as claimed in claim 14, wherein the coking operation is a delayed coking operation and the petroleum coke is delayed coke, the process further consisting essentially of:
pulverizing the delayed coke to a powder having an average particle size of about 200 μm prior to forming the petroleum coke/water slurry.

19. The process as claimed in claim 14, wherein the mixing step is substantially performed in a pipeline.

20. The process as claimed in claim 14, wherein the mixing step is substantially performed in a stirred tank reactor.

21. The process as claimed in claim 14, wherein the petroleum coke in the petroleum coke/water slurry is between about 10 to about 50 percent by mass.

22. The process as claimed in claim 14, wherein the petroleum coke in the petroleum coke/water slurry is between about 15 to about 30 percent by mass.

23. A process for treating water containing dissolved organics consisting essentially of the steps of:
removing petroleum coke from an oil sands bitumen coking operation;
pulverizing the delayed coke to a powder having an average particle size of about 200 μm prior to forming the petroleum coke/water slurry;
mixing the water to be treated with the petroleum coke to form a petroleum coke/water slurry having a petroleum coke concentration of at least about 10% by mass; and
allowing the petroleum coke/water slurry to mix for a sufficient length of time so that the petroleum coke adsorbs a portion of the dissolved organics from the water.

* * * * *